(12) United States Patent
Ciesicki

(10) Patent No.: US 12,527,656 B2
(45) Date of Patent: Jan. 20, 2026

(54) ORAL DIFFUSING DEVICE

(71) Applicant: HydrOral, SAS, Acigné (FR)

(72) Inventor: Matthew Ciesicki, Acigné (FR)

(73) Assignee: HydrOral, SAS, Acigné (FR)

( * ) Notice: Subject to any disclaimer, the term of this patent is extended or adjusted under 35 U.S.C. 154(b) by 0 days.

(21) Appl. No.: 17/656,568

(22) Filed: Mar. 25, 2022

(65) Prior Publication Data

US 2022/0304786 A1    Sep. 29, 2022

Related U.S. Application Data

(60) Provisional application No. 63/166,554, filed on Mar. 26, 2021.

(51) Int. Cl.
*A61C 19/06* (2006.01)
*A61C 7/08* (2006.01)
*A61K 9/00* (2006.01)

(52) U.S. Cl.
CPC .......... *A61C 19/06* (2013.01); *A61C 7/08* (2013.01); *A61K 9/006* (2013.01)

(58) Field of Classification Search
CPC ......... A61C 7/08; A61C 19/06; A61C 19/063; A61C 19/00; A61C 19/066; A61K 9/006; A61M 16/049; A61J 7/0092
See application file for complete search history.

(56) References Cited

U.S. PATENT DOCUMENTS

| | | | | |
|---|---|---|---|---|
| 1,797,946 A | * | 3/1931 | Eichel | A46B 11/001 401/184 |
| 3,503,127 A | * | 3/1970 | Kasdin | A61M 31/002 433/199.1 |
| 4,484,895 A | * | 11/1984 | Smiley | A61C 7/006 433/18 |
| 4,861,268 A | * | 8/1989 | Garay | A61J 7/0092 433/80 |
| 4,959,052 A | * | 9/1990 | Cox | A61C 5/70 433/80 |
| 5,037,295 A | * | 8/1991 | Bergersen | A61C 7/08 433/7 |
| 5,074,786 A | * | 12/1991 | Woodward | A61C 19/06 433/80 |

(Continued)

FOREIGN PATENT DOCUMENTS

| | | |
|---|---|---|
| WO | 2007140784 A2 | 12/2007 |
| WO | WO-2018017553 A2 * | 1/2018 ............ A61J 3/005 |

(Continued)

OTHER PUBLICATIONS

Keith Alexander; How to Ease the Nightly Symptoms of Dry Mouth: An Effective Oral Appliance; Jan. 25, 2019; 2022 DB Orthodontics Limited Website; 12 Pages.

(Continued)

*Primary Examiner* — Heidi M Eide
*Assistant Examiner* — Lina Faraj
(74) *Attorney, Agent, or Firm* — Whitmyer IP Group LLC

(57) ABSTRACT

A system for delivering an oral moisturizer is disclosed having an appliance disposed inside a user's mouth having a reservoir for receiving a predetermined amount of a product. The reservoir having ports for delivering the product into the user's mouth at a predetermined rate.

18 Claims, 31 Drawing Sheets

(56) References Cited

U.S. PATENT DOCUMENTS

| | | | | |
|---|---|---|---|---|
| 5,194,003 | A * | 3/1993 | Garay | A61K 9/0063 |
| | | | | 433/229 |
| 5,573,399 | A * | 11/1996 | McClintock, II | A61C 19/066 |
| | | | | 433/41 |
| 5,842,860 | A * | 12/1998 | Funt | A61J 7/0092 |
| | | | | 433/80 |
| 10,426,185 | B2 * | 10/2019 | Miki | A61J 7/0092 |
| 2001/0038994 | A1 * | 11/2001 | Komiyama | A61J 7/0092 |
| | | | | 433/167 |
| 2009/0105523 | A1 * | 4/2009 | Kassayan | A61C 7/008 |
| | | | | 340/693.1 |
| 2009/0136893 | A1 * | 5/2009 | Zegarelli | A61C 19/08 |
| | | | | 433/80 |
| 2009/0148812 | A1 * | 6/2009 | Pines | A61C 19/063 |
| | | | | 433/80 |
| 2012/0202172 | A1 * | 8/2012 | Raghuprasad | A61C 19/063 |
| | | | | 433/217.1 |
| 2012/0220986 | A1 * | 8/2012 | Wolff | A61M 31/002 |
| | | | | 604/892.1 |
| 2013/0087157 | A1 * | 4/2013 | Hawkins | A63B 71/085 |
| | | | | 264/16 |
| 2014/0014119 | A1 * | 1/2014 | Bardach | A61C 19/066 |
| | | | | 128/861 |
| 2014/0023994 | A1 * | 1/2014 | Zegarelli | A61C 19/066 |
| | | | | 433/215 |
| 2016/0278899 | A1 * | 9/2016 | Heller | A61K 31/198 |
| 2017/0172961 | A1 * | 6/2017 | Heller | A61K 9/0097 |
| 2017/0216148 | A1 * | 8/2017 | Altounian | A61M 31/00 |
| 2019/0282449 | A1 * | 9/2019 | Kudek | A61J 7/0053 |
| 2020/0038295 | A1 | 2/2020 | Lynch et al. | |
| 2021/0353387 | A1 * | 11/2021 | Velamakanni | A61C 19/063 |
| 2022/0117849 | A1 * | 4/2022 | Patil-Graziano | A61C 19/063 |
| 2022/0304786 | A1 | 9/2022 | Ciesicki | |
| 2023/0355939 | A1 * | 11/2023 | Heller | A61M 39/20 |

FOREIGN PATENT DOCUMENTS

| | | | | |
|---|---|---|---|---|
| WO | | 2020208620 A1 | 10/2020 | |
| WO | WO-2021048406 A1 * | | 3/2021 | A61C 17/024 |

OTHER PUBLICATIONS

Great Lakes Dental Technologies; Retrieved on Nov. 11, 2022.
Communication Relating to the Results of the Partial International Search Report; Application No. PCT/IB2024/050533; Issued: Sep. 16, 2024; 17 Pages.

* cited by examiner

ORAL DIFFUSING DEVICE

CROSS-REFERENCE TO RELATED APPLICATIONS

This application claims the benefit, under 35 U.S.C. § 119(e), of U.S. Provisional Application Ser. No. 63/166,554, filed on Mar. 26, 2021, the content of which is incorporated herein by reference in its entirety.

TECHNICAL FIELD

The present invention relates to a device for diffusing a product into a person's mouth, oral cavity, throat, and/or extra-thoracic region, including during sleep.

BACKGROUND

Dry mouth, often referred to as xerostomia, the feeling of the lack of saliva, or hyposalivation, the lack of salivation, is caused by a decrease in saliva production which affects millions of people. One out of four adults suffer from dry mouth, rising to more than 40% of the US population aged 55 years or older, with 38.5 million cases and increasing rapidly.

Saliva is a vital component of tasting and digestion; its lubricative properties are essential for swallowing and speech. Saliva also helps defend against tooth decay and oral infections. There are multiple causes of dry mouth. 64% of dry mouth cases are associated with medication use; the incidence rises with the number of medications taken (polypharmacy). Oral cancer treatments (radiotherapy and chemotherapy), diabetes, Sjögren's syndrome, and Parkinson's disease are also connected with salivary glands hypofunction and reduced saliva flows.

The effects of dry mouth are numerous: difficulty in swallowing, diminished sense of taste, sleep interruption due to thirst, oral infections and tooth decay, sore throat and mouth and difficulty speaking. All lead to lowered quality of life.

Treatment options consist almost exclusively of short-acting salivary flow stimulants to moisturize the mouth: oral rinses, toothpaste, chewing gum or sprays to temporarily alleviate symptoms of dry mouth. The existing methods for hydrating the mouth such as mouth rinse, toothpaste, lozenges, sprays, all require the patient to be awake for use, as an active hydration. The problem is that these solutions only are effective for a short time before requiring reapplication. Of course, this is not feasible while sleeping—treatment only occurs when the patient is awake. Additionally, such known methods present a choking hazard if used/applied when the patient is not awake.

The global dry mouth therapeutics market size was $602M in 2016, $1.35B in 2020, and estimated to be $3.12B in 2028. Rising incidence of dry mouth owing to increased consumption of medications, as a side-effect of chemotherapy and radiotherapy, from nerve damage or dehydration, and conditions affecting salivary glands has been boosting demand for dry mouth relief products and is a key factor expected to drive market revenue growth over the forecast period. Availability of wide range of products, increasing affordability, and growing awareness regarding the condition are some other key factors expected to fuel revenue growth of the market over the forecast period.

Prescription medicines such as antidepressants, antihypertensives, sedatives, antiemetics and antipsychotics affect salivary glands. The American Medical Association has identified more than 400 drugs that can cause xerostomia. Use of these drugs and especially polypharmacy—administration of multiple drugs—is increasing and is the number one factor in chronic dry mouth cases. The CDC reports 650,000 patients per year are treated in the US for cancer with chemotherapy. Chemotherapy is the second largest dry mouth cause factor, after polypharmacy.

Beyond dry mouth, other conditions may benefit from the distribution of products overnight. For example, solutions to treat sore throats or cough symptoms, or products that lubricate the throat/glottis to help reduce snoring may benefit from oral diffusion. Additionally, it is possible to diffuse treatment throughout the entire extra-thoracic region including the oral cavity, and pharynx. Aside from hydration or humectant products, medicines, such as pain relievers, may be delivered in passive, slow acting, and constant diffusion.

Additionally, there is a need for hydration for long-term patients, such as coma patients, or patients who are using compressed oxygen. The use of passive hydration may allow higher oxygen levels to be utilized for patients. Commercial deep-sea and recreational divers and first responders who use bottled oxygen may benefit from oral hydration. Athletes, especially those competing in endurance sports, may benefit from oral hydration or diffusion of gels that include electrolytes, salts, carbohydrates, etc.

There are no passive methods for dispersal of the oral products which addresses all of the aforementioned issues. One known product, XYLIMELTS, sticks to the wall of the mouth, however, patients need to be awake during administration to prevent a choking hazard. In every case the patient needs to be awake to initiate and complete treatment. There are no products that allow treatment while the patient sleeps; sleep disruption due to dry mouth symptoms or other ailments is a major issue. In addition, an overnight product could be worn during the day to provide maximal dry mouth or other ailment relief.

These and other problems are solved by the present disclosure.

SUMMARY

The needs set forth herein as well as further and other needs and advantages are addressed by the present embodiments, which illustrate solutions and advantages described below.

Disclosed herein is a device and system that passively delivers oral moisturizing products, medicines, or other treatments, including while the patient is sleeping, which provides benefits of convenience compared with an active delivery of the medicines or products. Multiple embodiments are envisioned.

It is a goal of the present invention to provide a device for treating xerostomia and/or hyposalivation—chronic dry mouth.

It is another goal of the present invention to provide a passive device for treating xerostomia and/or hyposalivation.

It is another goal of the present invention to provide a device for treating xerostomia and/or hyposalivation while the user sleeps.

It is another goal of the present invention to provide a device for diffusion of medicines inside the mouth.

It is another goal of the present invention to provide a device for the treatment of snoring, sore throat, and cough.

It is another goal of the present invention to provide a device for athletic/performance enhancement through diffusion of electrolytes and hydrating materials.

It is another goal of the present invention to provide a device to help equalize ear pressure by inducing swallowing.

It is another goal of the present invention to provide a device to help patients who may be unconscious for short durations such as during a lengthy surgery, and/or for long durations such as elderly, possible bed-ridden or dementia patients, or coma patients.

It is another goal of the present invention to provide a device which diffuses various products inside the mouth with low or no choking hazard.

It is another goal of the present invention to provide a device which addresses the aforementioned advantages and solutions in tandem with dentures, false teeth, or other prostheses.

In one aspect of the invention, a system for delivering an oral treatment is provided having an appliance disposed inside a user's mouth having a reservoir for receiving a predetermined amount of a product. The reservoir having ports for delivering the product into the user's mouth at a predetermined rate.

In one aspect of the invention, a system for delivering an oral treatment is provided having a support having a palate-contacting or teeth-contacting portion and a reservoir disposed on the palate-contacting or teeth-contacting portion of the support. The reservoir may be configured to deliver a predetermined amount of a product to a user's mouth during the user's non-active treating of the mouth.

In one aspect of the invention, a system for delivering an oral treatment is provided having a first material configured to be inserted in a user's mouth and a reservoir disposed in the first material. The system may also have a closure piece configured to coordinate with the first material to receive a product in the reservoir. The reservoir may be configured to deliver a predetermined amount of the product to the user's mouth during the user's using of the system at a predetermined rate.

DETAILED DESCRIPTION

The present teachings provide a system or a device for delivering an oral treatment, which includes a reservoir disposed on a palate-contacting or teeth-contacting portion of a piece wearable in a user's mouth, and the reservoir is configured to deliver a predetermined amount of the oral treatment to a user's mouth during the user's non-active treating of the mouth such as during sleep. The oral treatment may be medicines or hydrating products, for treating xerostomia and/or hyposalivation, for treating snoring, sore throat, and cough, for athletic/performance enhancement through diffusion of electrolytes and hydrating materials, and/or for helping patients who may be unconscious for short duration such as during a lengthy surgery, and/or for long duration such as elderly, possible bed-ridden or dementia patients, or coma patients using oxygen. The reservoir may be in various shapes. The reservoir may be formed with various materials. The reservoir may use various releasing mechanism for delivering the oral treatment. The reservoir may use various locking mechanisms for receiving the oral treatment. The oral treatment may be treatment of the mouth, teeth, gums, tongue, oral cavity, throat, and extra-thoracic region of the user.

Figure 1:
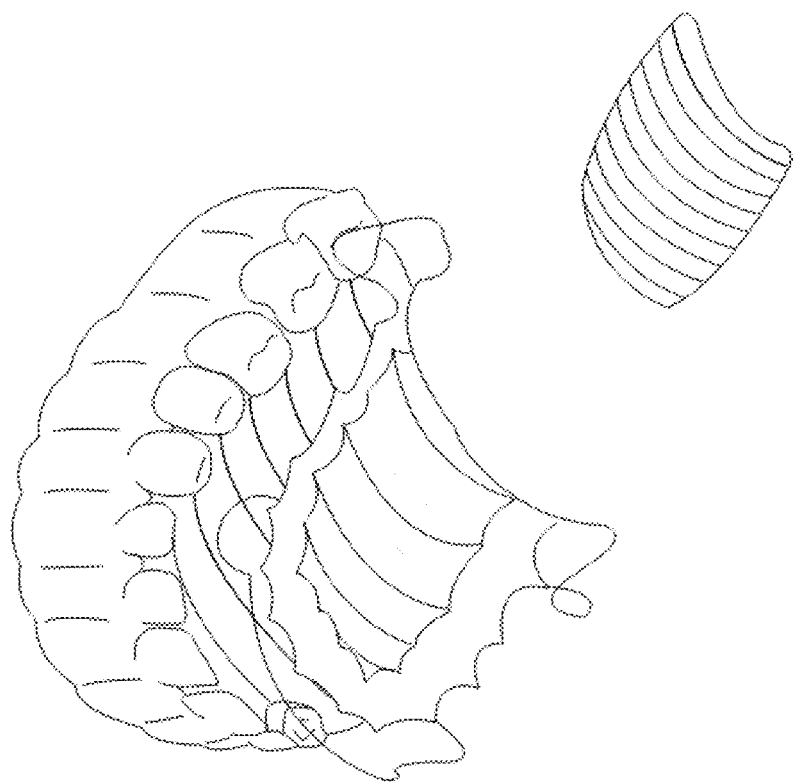
FIG. 1 is an isometric view of an embodiment of the present invention.

FIG. 1 illustrates a system or device according to an embodiment of the present teachings. As shown in FIG. 1, the device may take the shape of an oral upper palate Hawley, or 'wire', appliance, which is placed inside and/or between the upper teeth. The standard 0.7 mm plastic body may gently rests against the upper palate, or roof of the mouth. In one embodiment the plastic body may be positioned such that it does not contact the upper palate and/or is held away from the upper palate. The plastic body may be adapted to incorporate a permeable material, such as a polyethylene or other foam, on the inferior surface of the appliance base; such material may be saturated with a small volume of oral moisturizer (of which there are many FDA approved brands and brands that do not require FDA approval). The permeable material may be calibrated to continually release very small quantities (approximately 2-3 milliliters of oral moisturizer over an 8 to 10-hour period) of oral moisturizer into the patient's mouth, thus ameliorating the patient's dry mouth condition. The constant and passive delivery of product may be delivered while the patient is sleeping and may present a low or no choking hazard.

The oral moisturizer may be replaced with various products to treat different ailments or for different applications. For example, product may be a menthol lozenge, electrolytes, medicine, or other orally diffused substance.

The permeable material may be permanently mounted to the base of the appliance, and thus replenished daily. The permeable material may also take the form of a small sponge-like cartridge that is affixed to the inferior surface of the appliance. In this case the permeable material may be disposable, and changed daily, or as needed. Multiple methods of affixing the permeable cartridge to the appliance base are foreseen. Further, the plastic base of the appliance itself may be hollowed to create a refillable reservoir and the inferior surface micro-perforated to allow permeability for appropriate dispersal of oral moisturizer. The permeable material may be inside of or attached to the plastic base and may be positioned such that the permeable material does not contact the user's upper palate.

While envisioned for use at night, the device may also be worn during waking hours.

Figure 2:
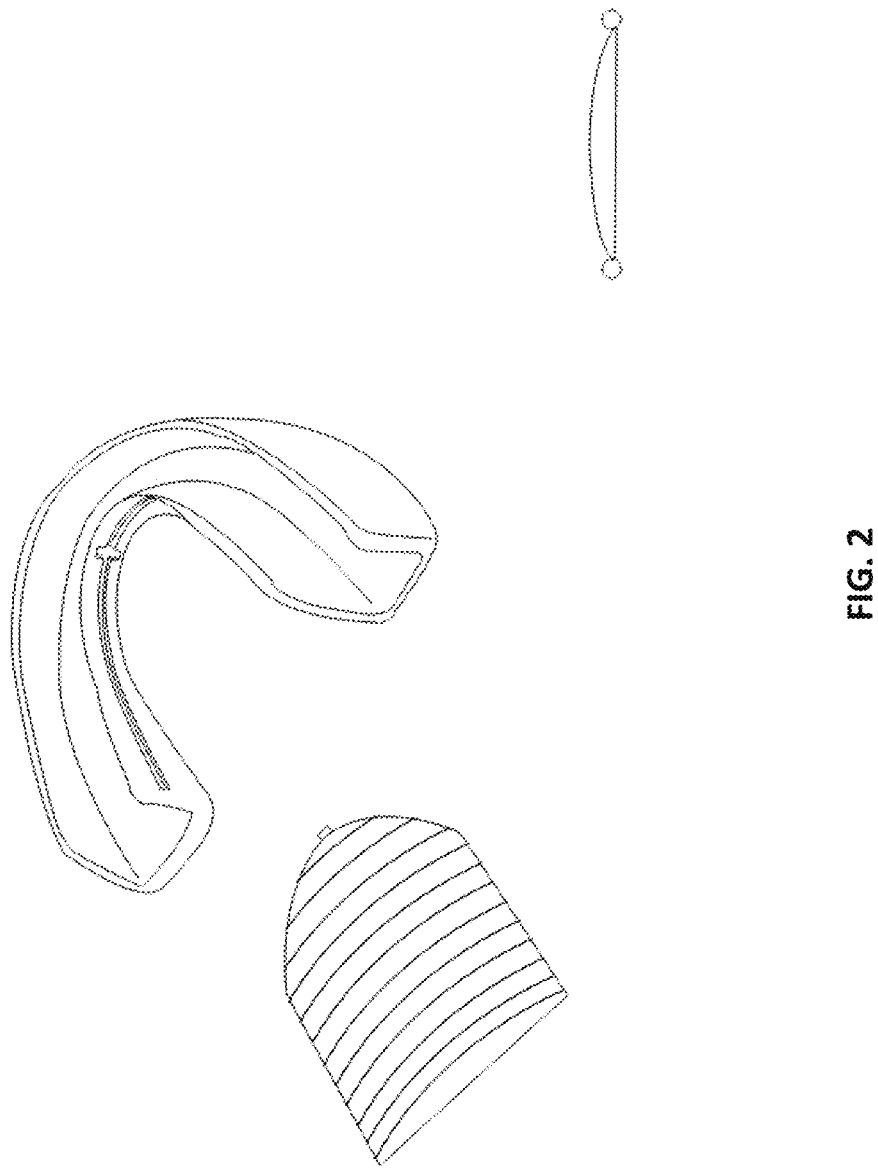
FIG. 2 is an isometric view of an embodiment of the present invention.

FIG. 2 illustrates a system or device according to an embodiment of the present teachings. As shown in FIG. 2, another embodiment resembles the form of an Essix, vacuum or thermoformed appliance. The Essix appliance (and related 'aligner' products such as 'Visalign') are made of a clear plastic and fit over the teeth snugly. Vacuum pressure and friction hold this style of appliance in place. There is usually no internal base situated under the palate—although the appliance shape may be modified to include one. In this case, dispersal of oral humectant would be largely as described above.

Alternately, a rigid or semi-rigid permeable cartridge may be inserted into small tracks, grooves, or channels, on the medial vertical surface to provide a changeable or rechargeable delivery system. Other methods of affixing the permeable cartridge are envisioned.

Additionally, it can be visualized that an Essix-style device may be fitted with permeable material on the lateral, medial, or both, sides of the device structure. The product, cartridge, or foam pads may be inserted into the device.

Finally, the form of this device may have slightly larger dimensions to contact the gum-line—more reminiscent of an athletic mouthguard. The device may take the form of an anti-bruxism (teeth grinding) device or snore ameliorating device which displaces the glottis.

While some embodiments described herein interface with a user's palate, it may also be envisioned that the device may sit in other areas of a user's mouth, such as below the tongue, near salivary glands, on the user's gums, teeth, or jaw, on false teeth, full or partial dentures, or other prosthetics. The device may be configured to conform to a user's mouth including teeth, false teeth, dentures, gaps in the teeth, removed teeth, chipped, broken, or crooked teeth, teeth modifications, other prosthetics, or the user's gums or jaw.

Figure 3:
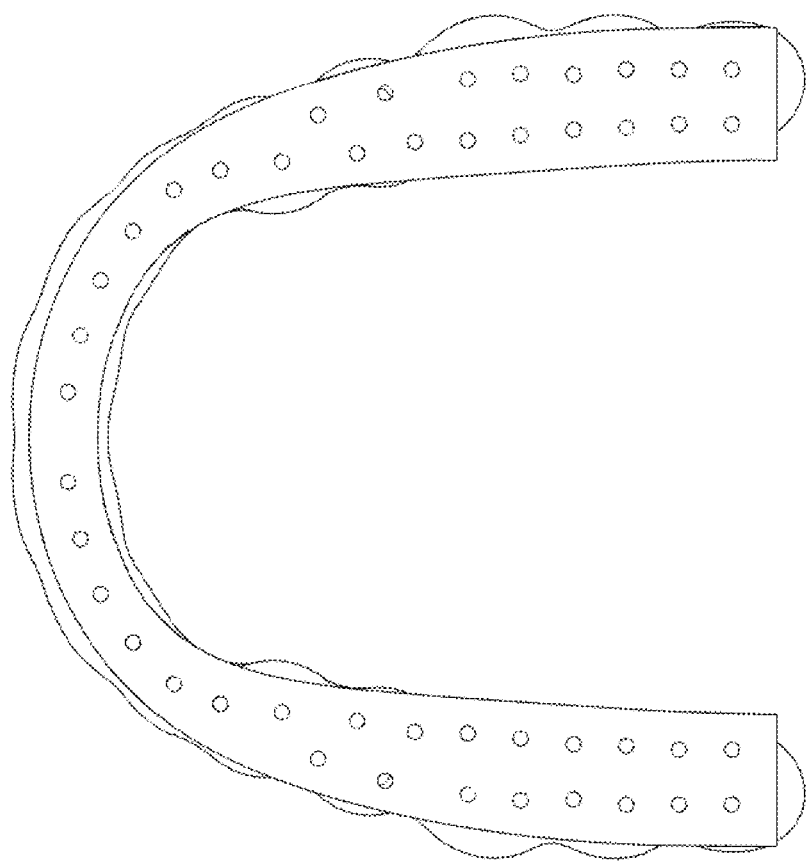
FIG. 3 is a bottom view of an embodiment of the present invention.
Figure 4:
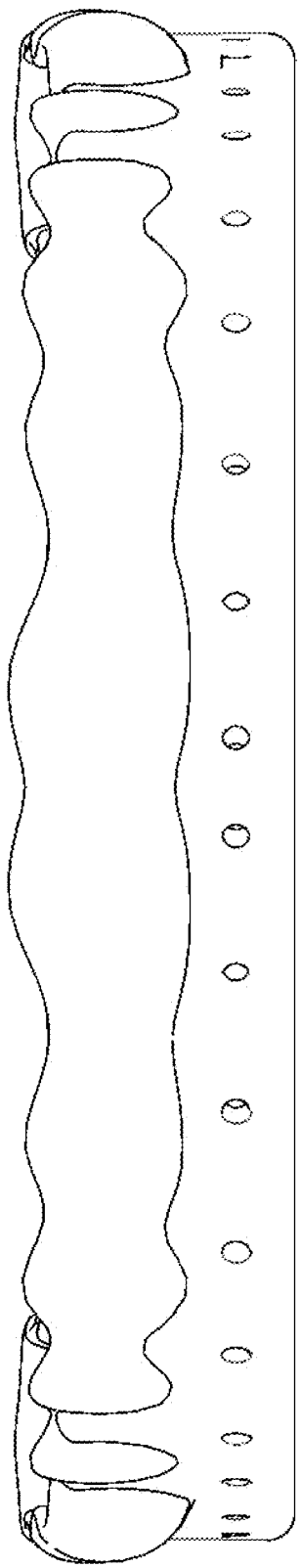
FIG. 4 is a front view of the embodiment of FIG. 3.
Figure 5:
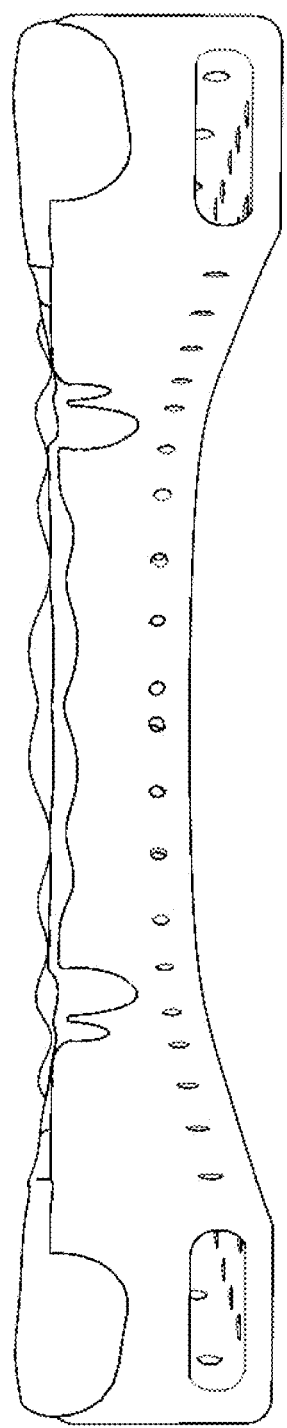
FIG. 5 is a back view of the embodiment of FIG. 3.

FIGS. 3-5 illustrates a system or device according to an embodiment of the present teachings. As shown in the embodiment of FIGS. 3-5, a canal can extend around the appliance. The appliance may be custom fit to a user's mouth using known methods or may be a generic model. The product may be inserted into the canal to be dispensed over time through ports along the appliance. Product may be gels, viscous sprays, liquids, solids, or other diffusible material capable of being inserted into the canal. The ports on the appliance may be sized, shaped, and positioned to ensure that the product is dispensed at a proper rate. Depending on the size of the patient's appliance, the volume will be about 1.5 ml of product—which is equivalent to an 8-to-10-hour dosage of product.

Figure 6:
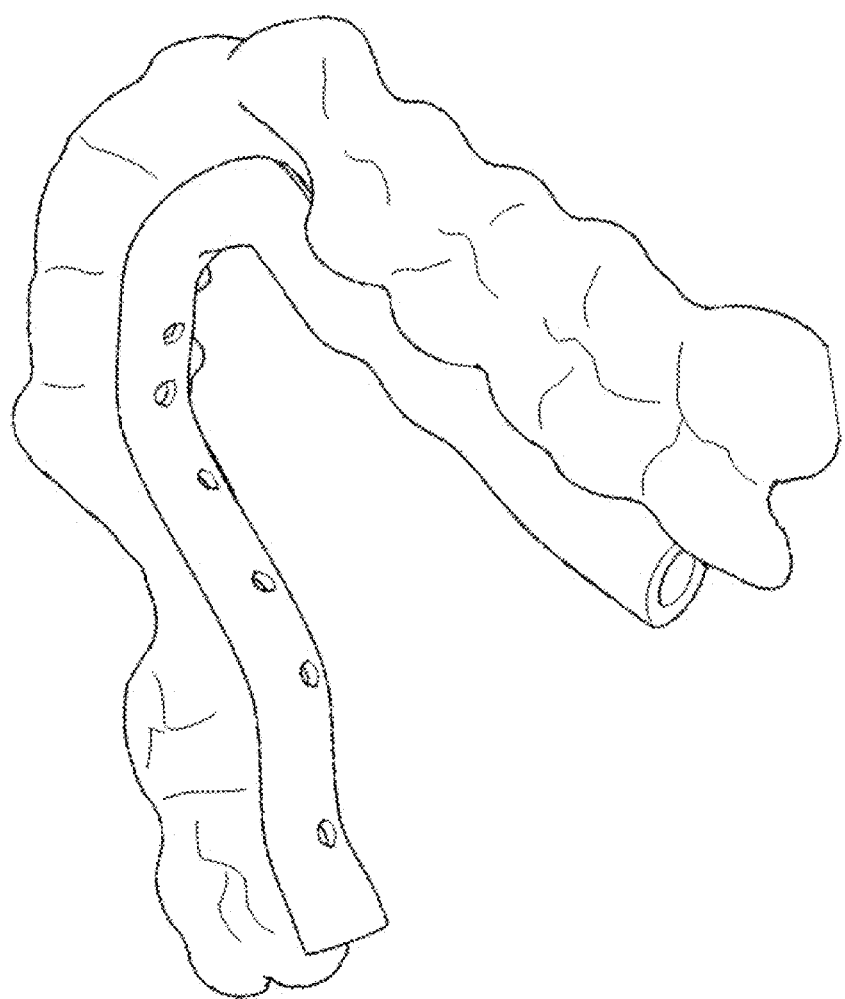
FIG. 6 shows a perspective view of an appliance for an upper palate device according to an embodiment of the present invention.
Figure 7A:
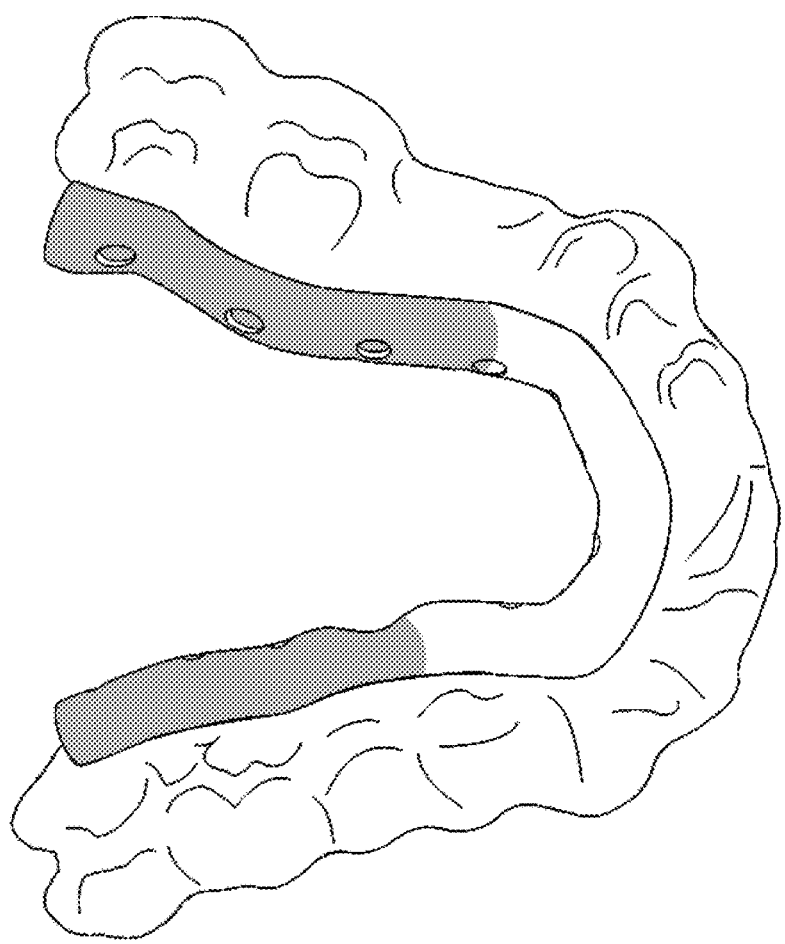
FIGS. 7A-B show bottom views of the appliance of FIG. 6 including product.
Figure 7B:
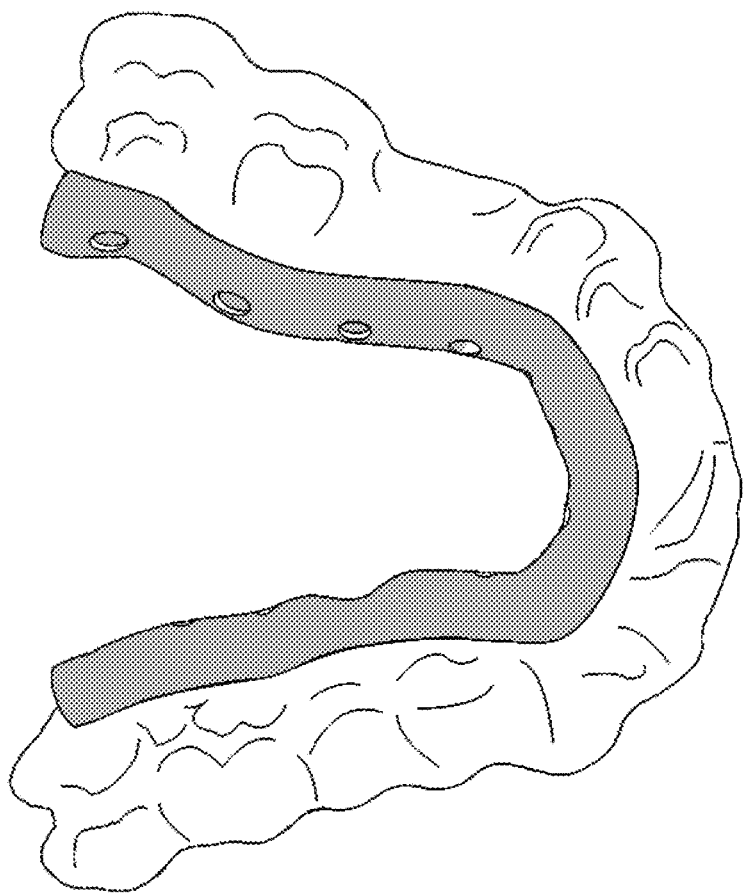
Figure 8A:
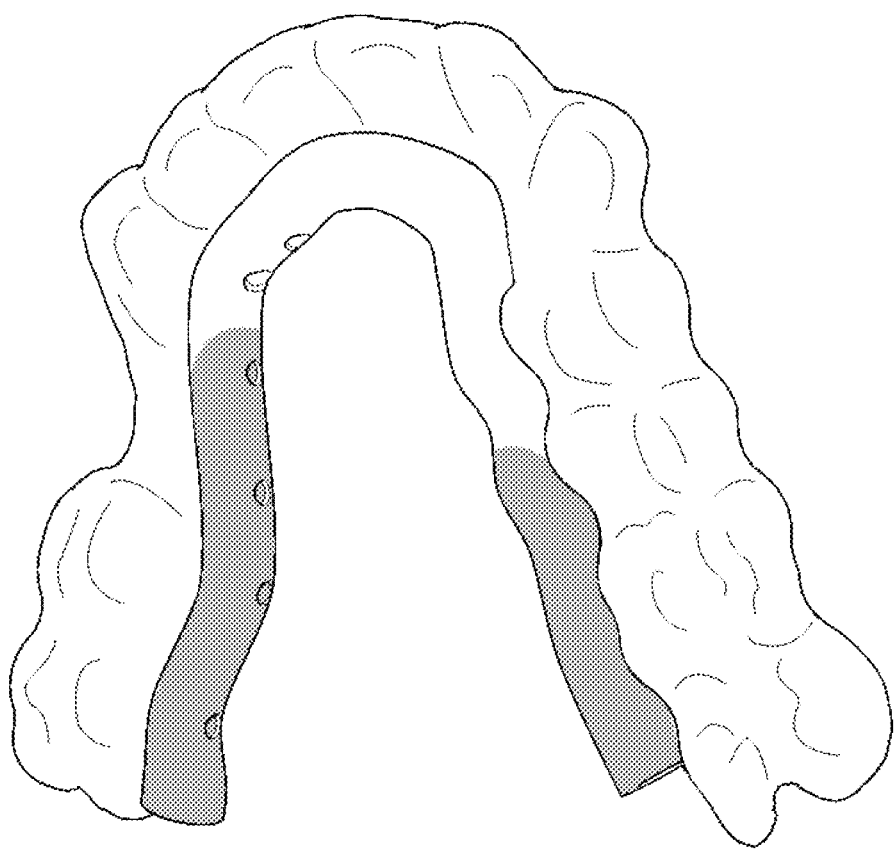
FIGS. 8A-B show perspective views of the appliance of FIG. 6 including product.
Figure 8B:
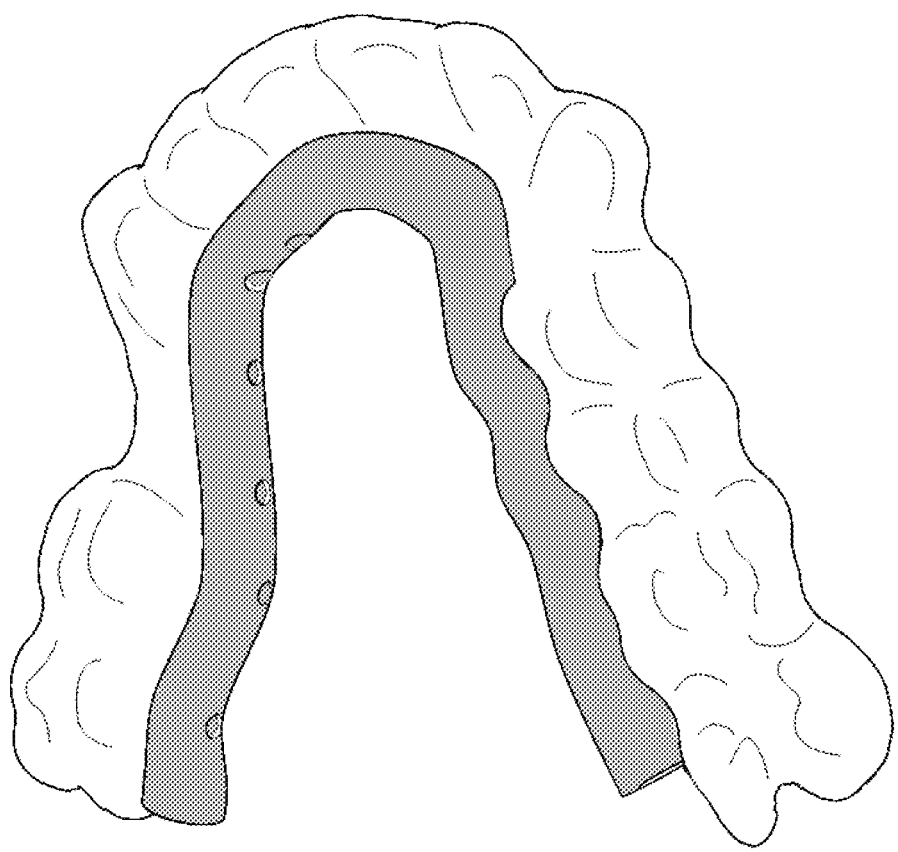
Figure 9A:
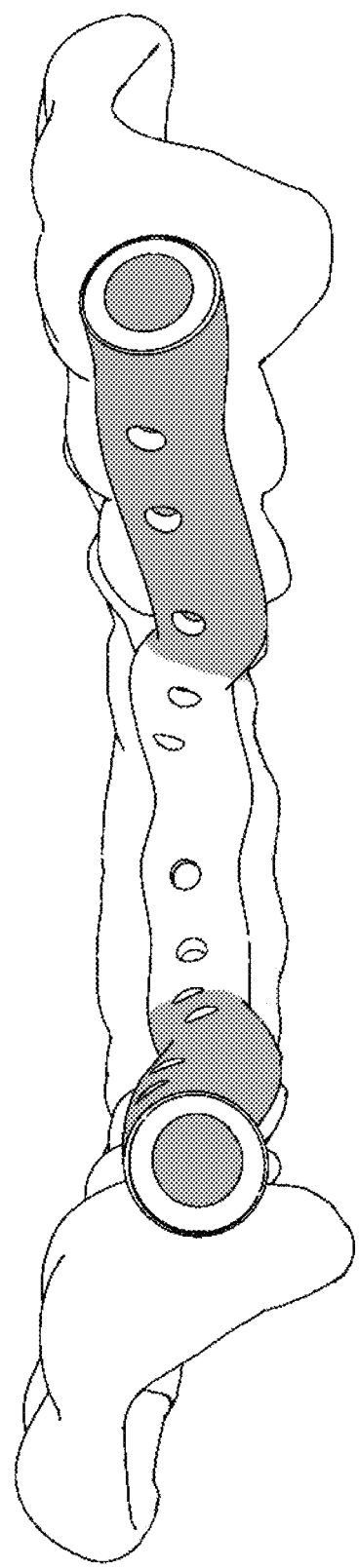
FIGS. 9A-B show back views of the appliance of FIG. 6 including product.
Figure 9B:
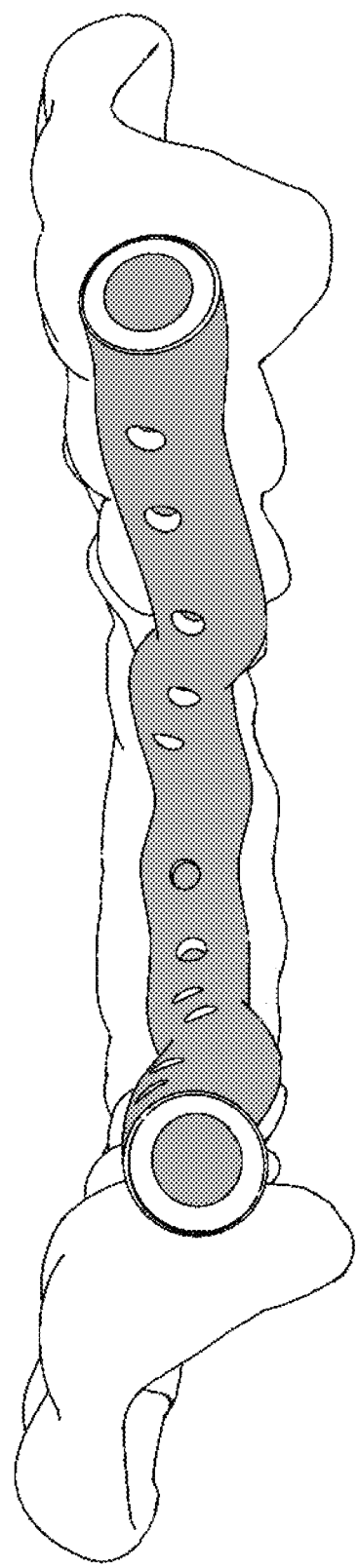

FIGS. 6-9B illustrate a system or device according to an embodiment of the present teachings. FIG. 6 shows a resulting appliance using a custom mold of a user's mouth. FIGS. 7A-9B show the appliance as partially filled and filled with an oral treatment material, which diffuses over several hours. The reservoirs in the appliance shown in FIGS. 7A, 8A, and 9A have been partially filled and FIGS. 7B, 8B, and 9B have been fully filled with the oral treatment material.

In some embodiments the device may be integrated partially or fully inside of the user's teeth in the case of false teeth, dentures, or other prosthetics. The dentures or false teeth may contain reservoirs or canals, in all or some of the false teeth or dentures, for product to be loaded into and diffused into the patient's mouth.

Figure 10:
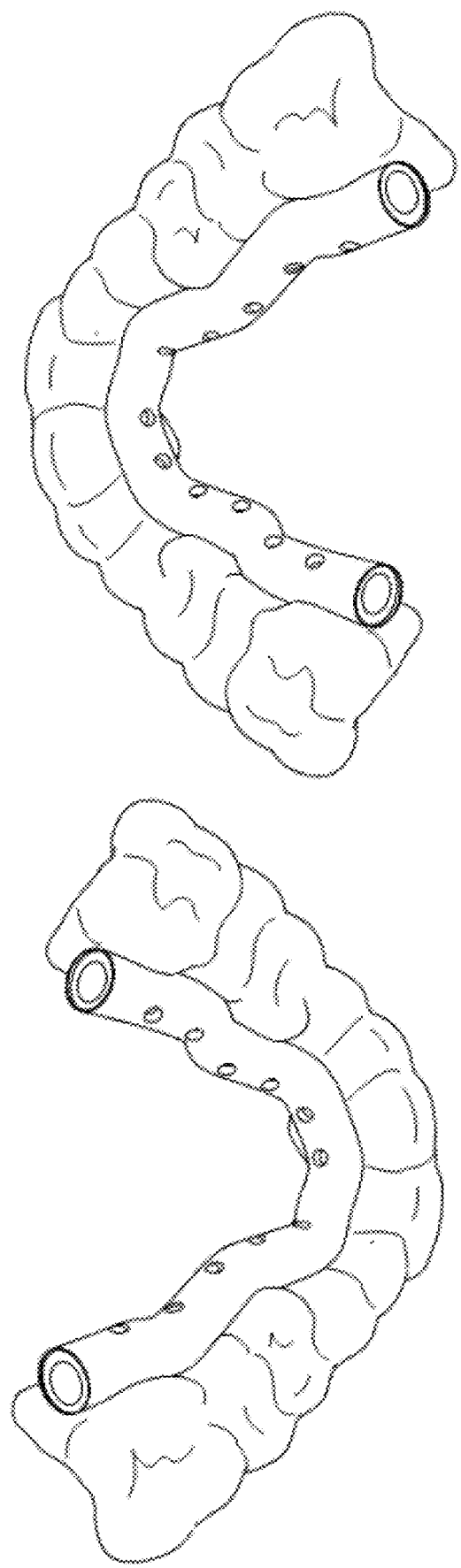
FIG. 10 shows different views of a customized mold insert (using a 3D dental model of a user's mouth) having a canal according to an embodiment of the present invention.
Figure 11:
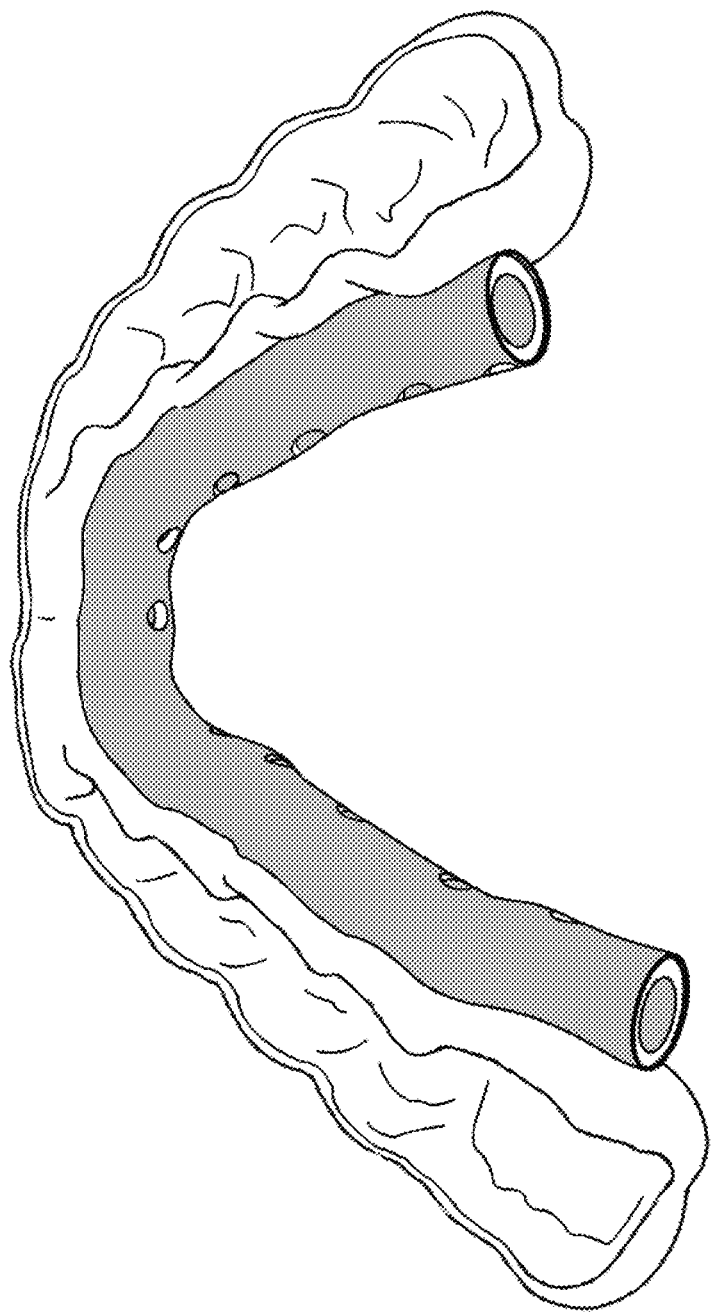
FIG. 11 and FIG. 12 show different views of the mold insert having a canal including product of FIG. 10.
Figure 12:
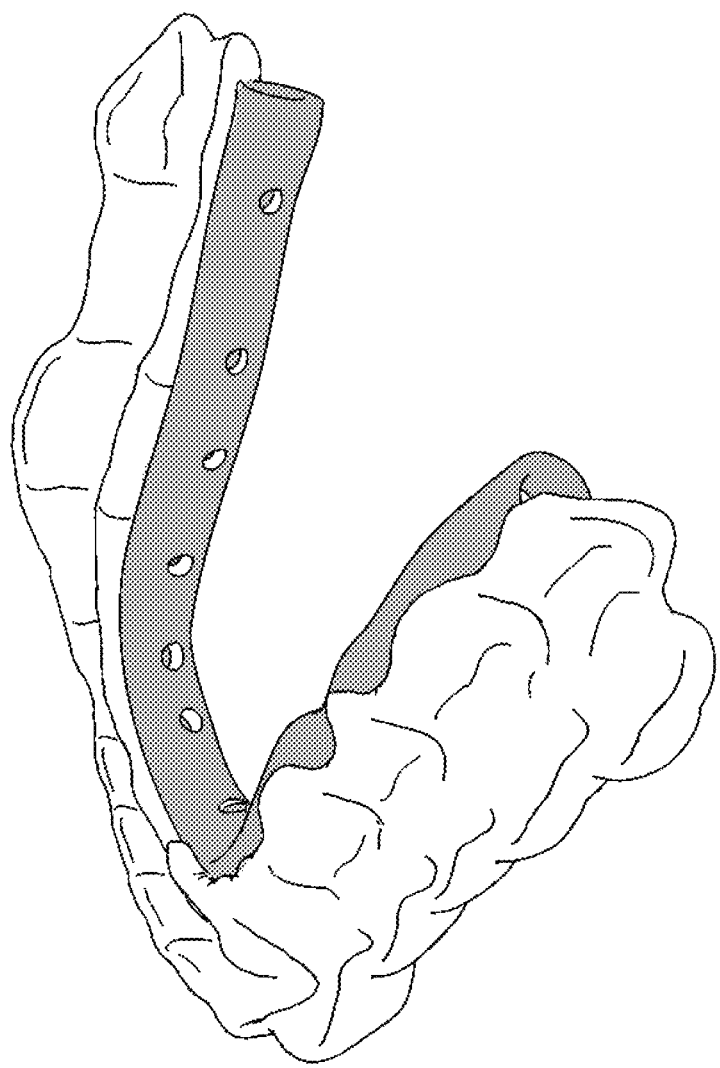

FIGS. 10-12 illustrate a system or device according to an embodiment of the present teachings. FIG. 10 shows different views of a mold insert having a canal. The mold insert is customized with teeth and gums based on the 3D dental model of a user's mouth. FIG. 10 shows the mold insert having the canal. Thus, the device shown here has two main components: the mouthpiece to hold the device in position, and the canal, which is the reservoir that holds the product. The canal in FIG. 10 has not been filled. FIGS. 11 and 12 shows different views of the mold insert customized with teeth and gums based on the 3D dental model of a user, and the mold insert having a canal filled with a product for oral treatment. The canals shown in FIGS. 11 and 12 are fully filled with the product for oral treatment. The product is injected into the canal, ready for treatment. There are multiple small holes in the canal, which allow the product to be loaded into the canal and slowly disperse while the patient is sleeping, thus hydrating the mouth throughout the night—without any choking hazards. This can be referred to as passive hydration.

Figure 13:
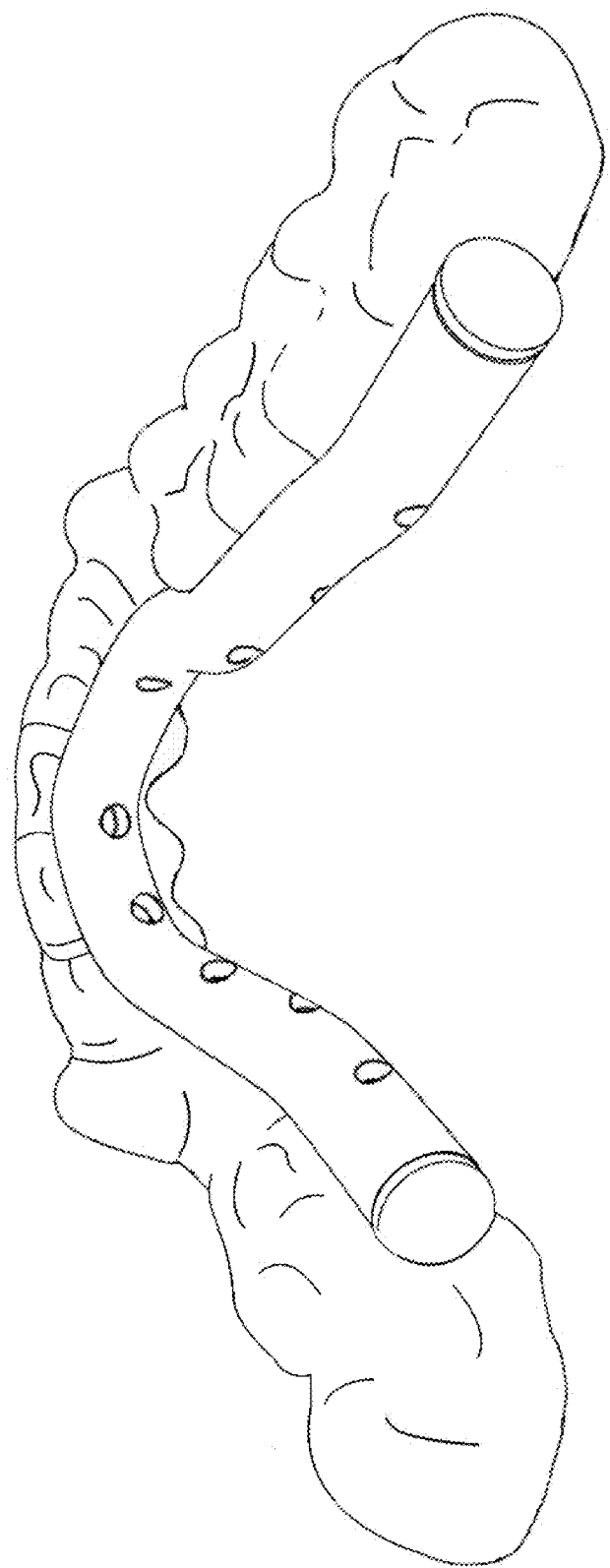
FIG. 13 shows a perspective view of the device with a canal, which is the reservoir that holds the product or other medication according to an embodiment of the present invention.
Figure 14:
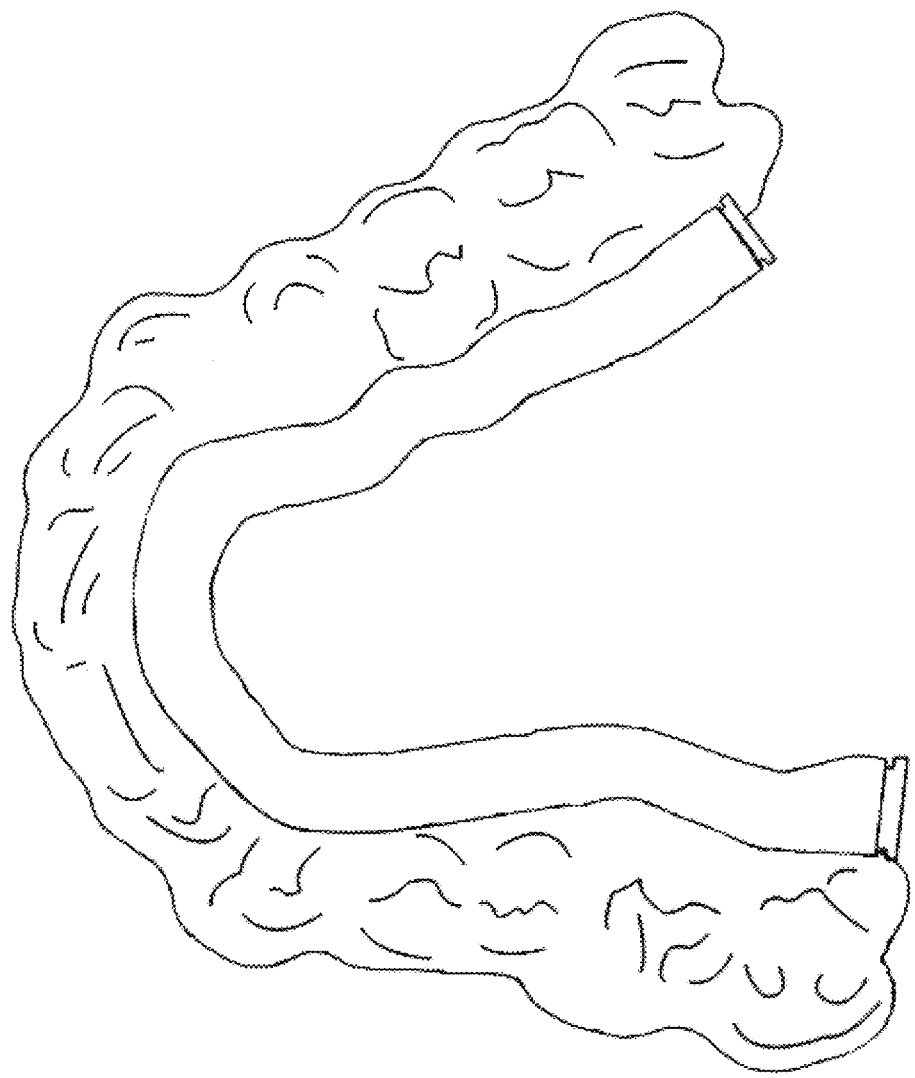
FIG. 14 shows a top view of FIG. 13.

FIGS. 13-14 illustrate a system or device according to an embodiment of the present teachings. FIG. 13 shows a perspective view of the device as the canal, which is the reservoir that holds the hydrating product, other medication, or product for diffusion. The canal is attached to an existing device such as an appliance or a mold insert and runs along the inside of the appliance, or the mold insert. In FIG. 13, the canal is glued to an upper appliance or an upper mold insert using UV-catalyzed biocompatible resin. The appliance or the mold insert may be thermoformed, or 3D mold printed, among other known dental appliance forming methods. The tips attached to the canal are used to enclose the hydrating product, other medication, or product for diffusion, in the canal and can be opened for refilling and cleaning of the canal. FIG. 14 shows a top view of FIG. 13. The canal may also be refilled using the small holes along the canal.

Figure 15:
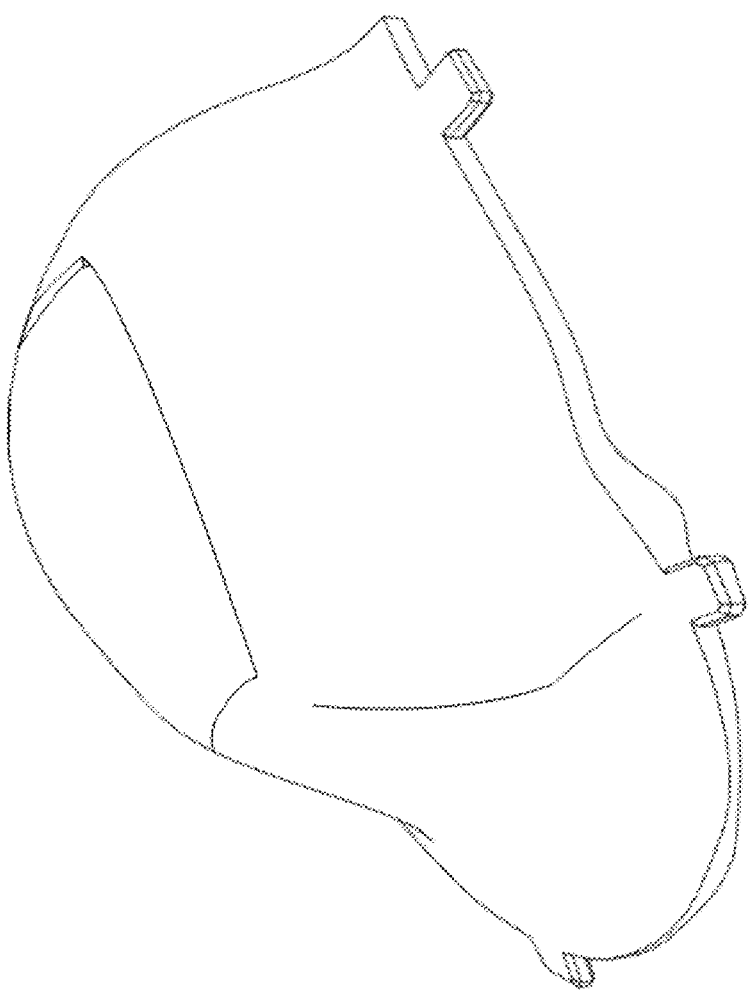
FIG. 15 shows a device having a full palate-covering plate having a reservoir space according to an embodiment of the present invention.
Figure 16:
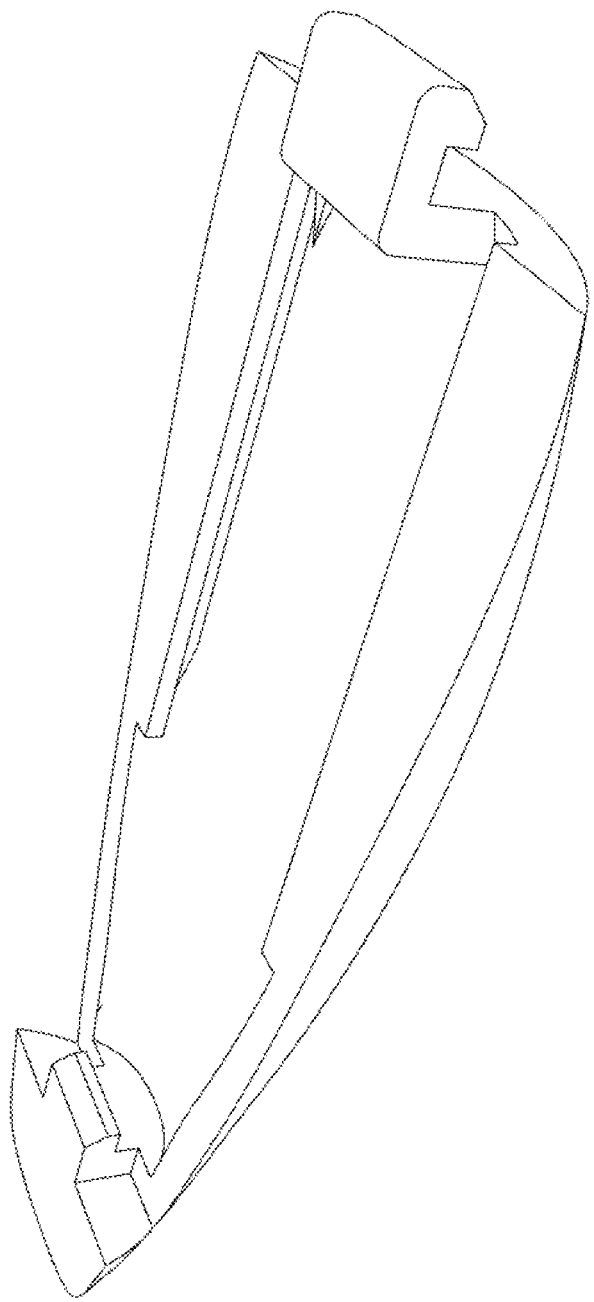
FIG. 16 shows the small compartment piece of the device of FIG. 15.
Figure 17:
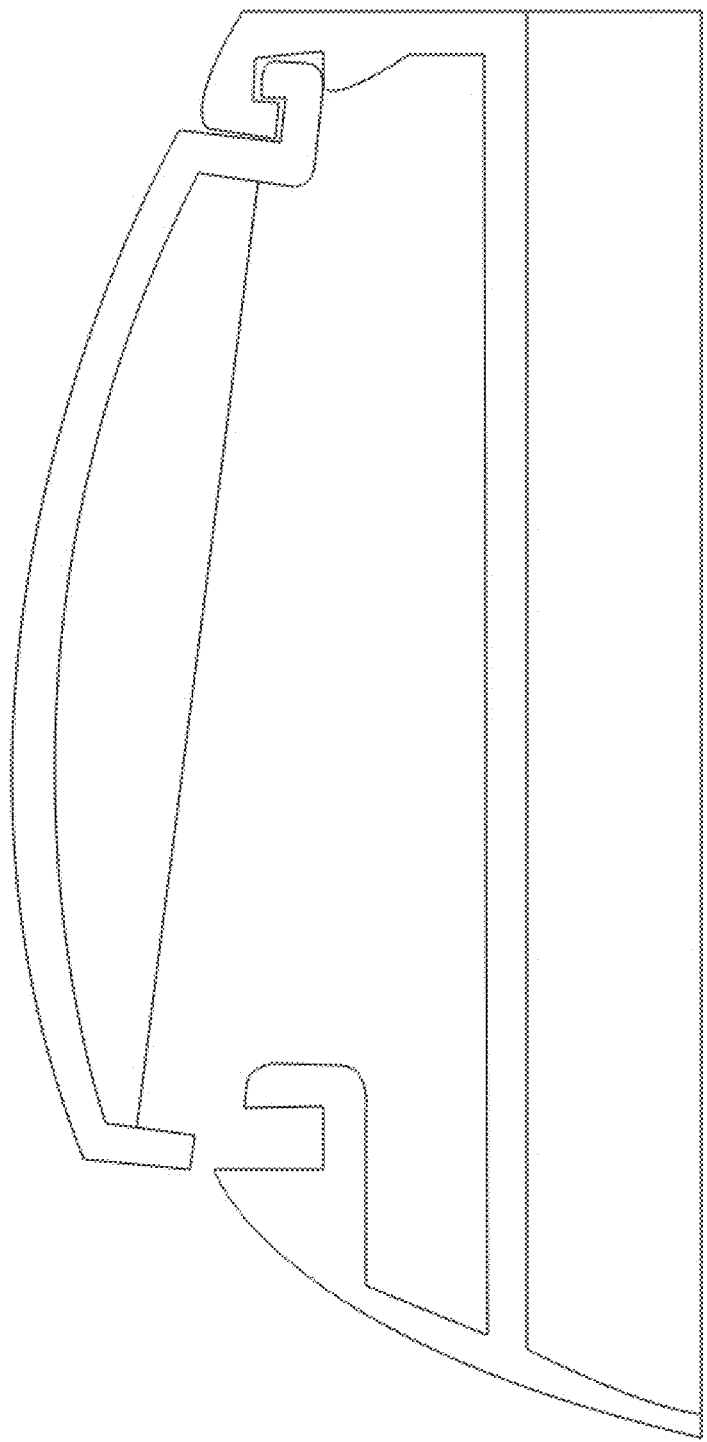
FIG. 17 shows the open/close mechanism of the device of FIG. 15.
Figure 18:
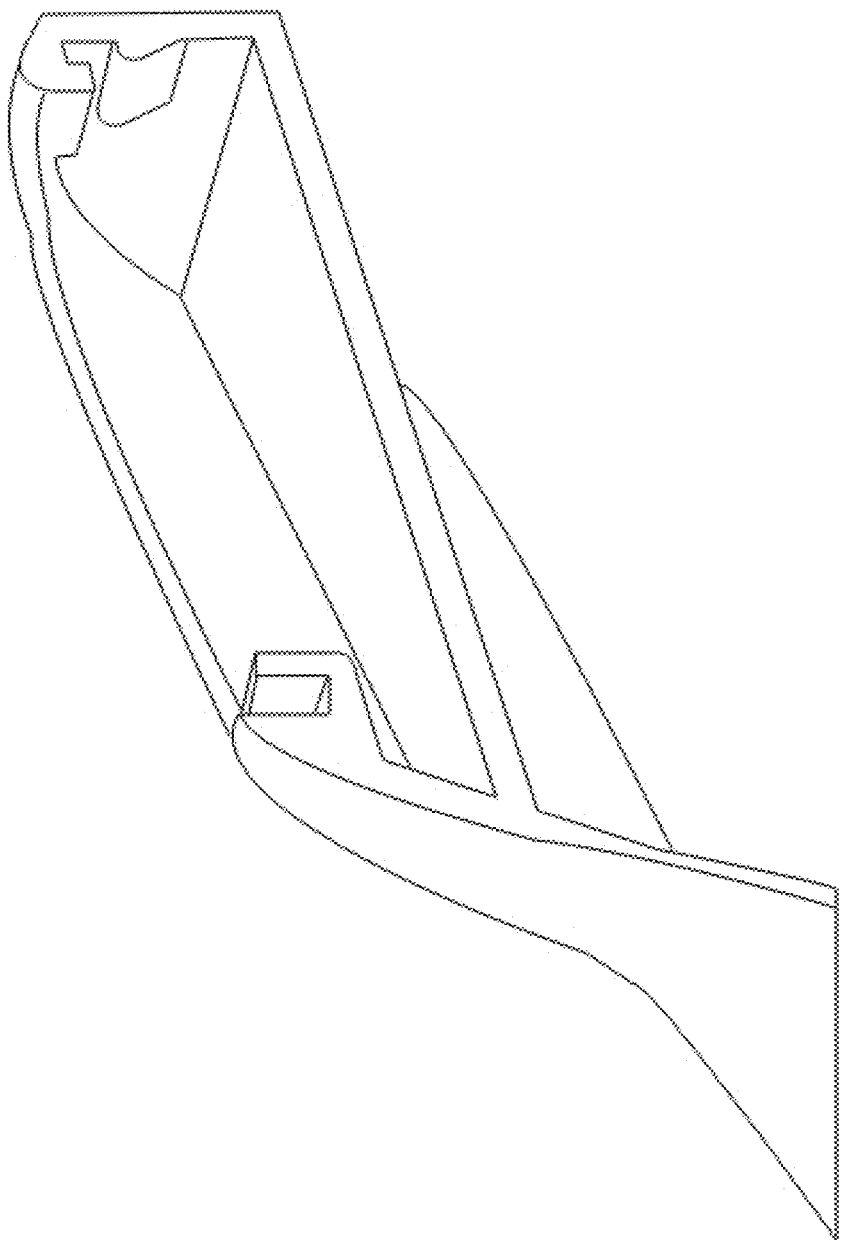
FIG. 18 shows a cross section of the area including the reservoir space in the palate-covering plate of the device of FIG. 15.

FIGS. 15-18 illustrate a system or device according to an embodiment of the present teachings. FIG. 15 shows a device having a full palate-covering plate having a reservoir space. A small compartment piece is placed on the plate at the center area, which covers the reservoir space and creates a reservoir for containing and delivering the oral treatment products. The small compartment piece can be closed securely with a latch and press clip from the top and can be easily opened for cleaning. This design allows introduction of a foam pad, cartridge, or mesh infused with a client's proprietary product, or commercially available product and is compatible with a straight Hawley type appliance. FIG. 16 shows the small compartment piece of the device of FIG. 15. FIG. 17 shows the open/close mechanism of the device of FIG. 15. FIG. 18 shows a cross section of the area including the reservoir space in the palate-covering plate of the device of FIG. 15. It is noted that an appliance is not shown in FIG. 15, but the device of FIG. 15 has the connecting mechanism that provide the attachment to the appliance, and thus the device may be used with or without an appliance. The device may have holes along the surface proximal and/or distal to the palate. The holes may be directly connected to the reservoir or may be connected to channels connected to the reservoir. Product in the reservoir may flow through the holes into the patient's mouth or may be moved through channels or passages to distribute the product throughout the user's mouth and may be directed in varying concentrations to different locations in the user's mouth. The holes may be circular holes, slits, meshes, or other opening to allow the diffusion of product from the reservoir.

Figure 19:
FIG. 19 shows a device having an appliance with a full palate-covering plate having a reservoir space according to an embodiment of the present invention.
Figure 20:
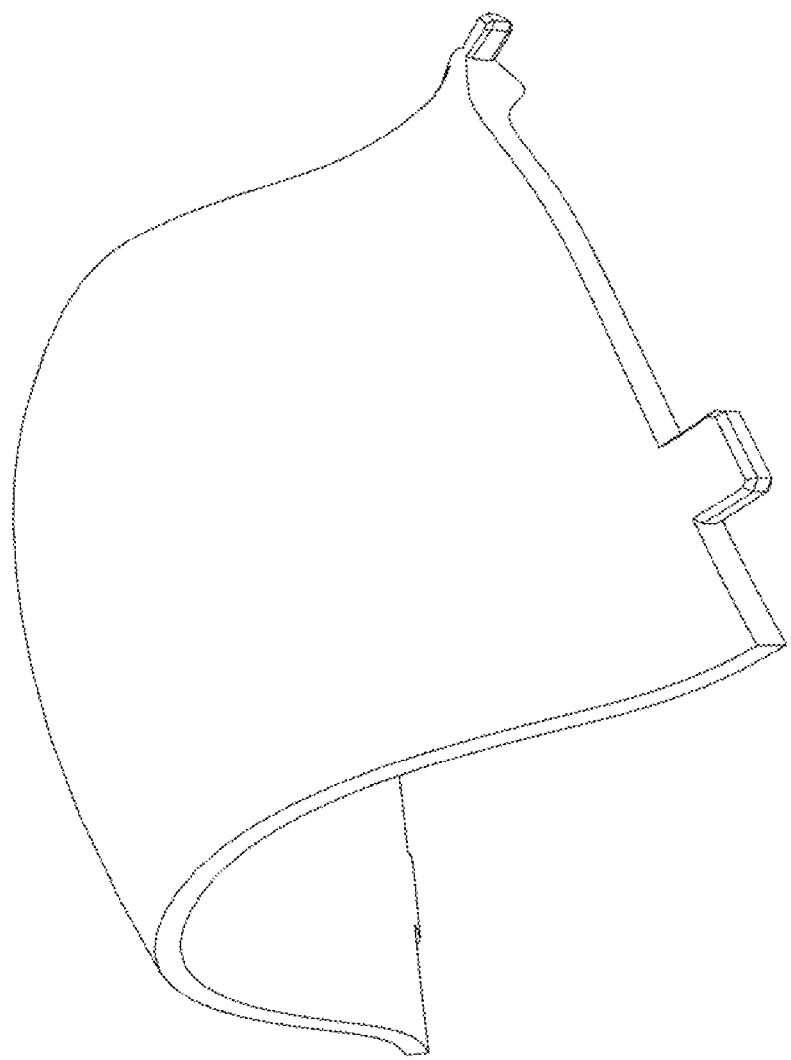
FIG. 20 shows an upper piece to be used with the device of FIG. 19.
Figure 21:
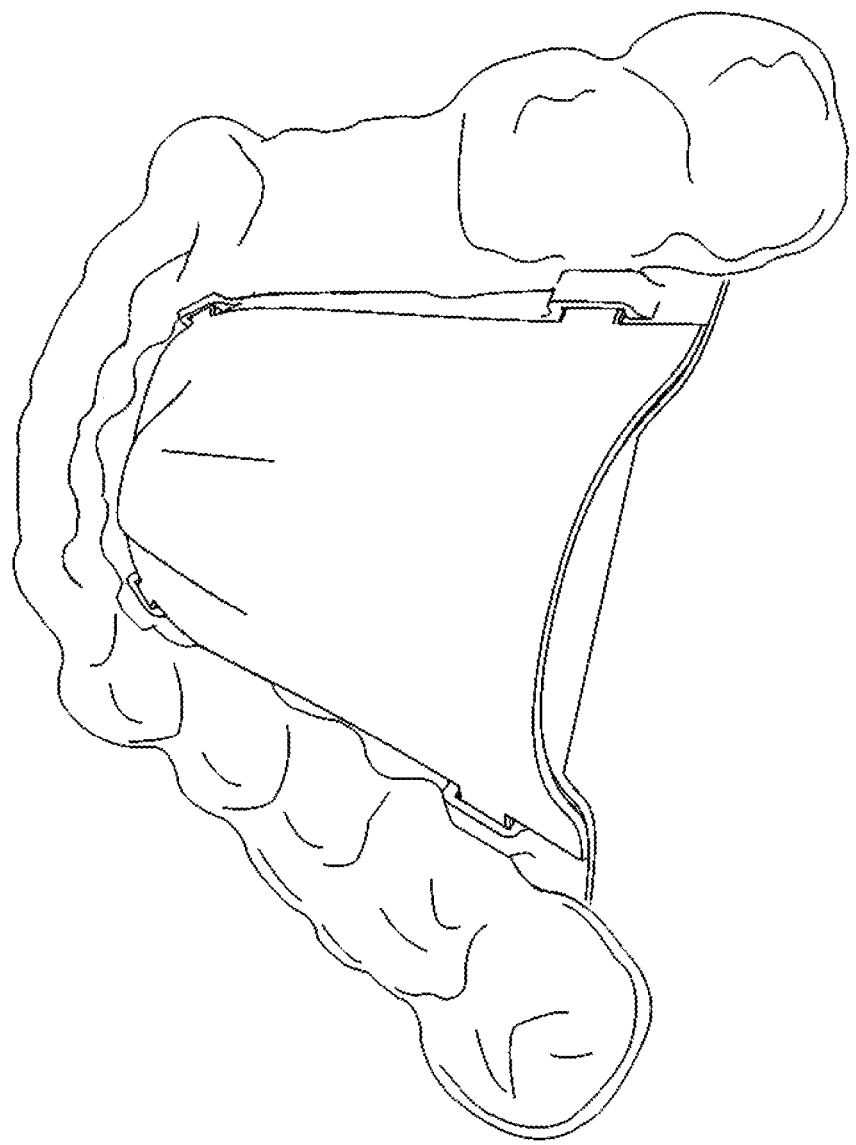
FIG. 21 shows an assembly of pieces of FIGS. 19 and 20 to form a reservoir.
Figure 22:
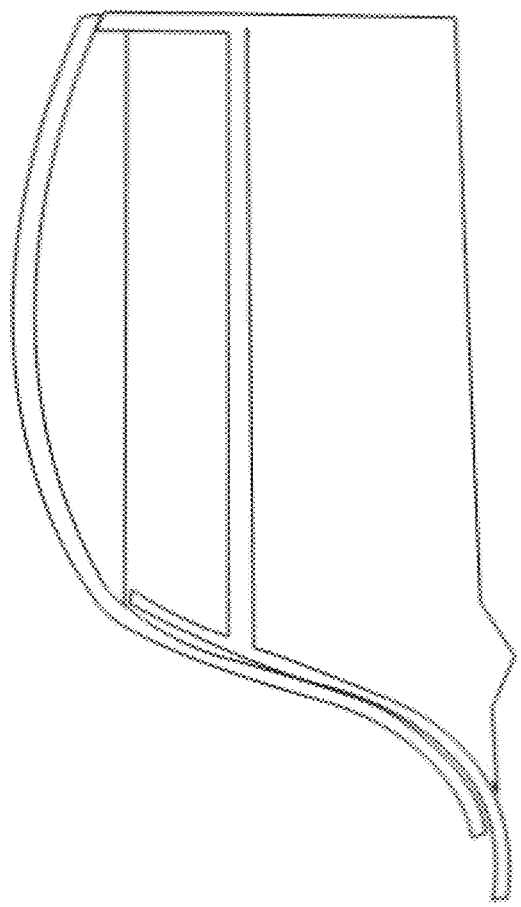
FIG. 22 shows a cross section of the area including the reservoir space in the palate-covering plate of the device of FIG. 21.

FIGS. 19-22 illustrate a system or device according to an embodiment of the present teachings. FIG. 19 shows a device having an appliance with a full palate-covering plate having a reservoir space. FIG. 20 shows an upper piece, which is slightly larger than the palate-covering plate and will slide over the palate-covering plate and be latched to the palate-covering plate to form a reservoir as shown in FIG. 21. This design may allow for a cartridge, foam pad, or mesh, containing or infused with an oral treatment, proprietary product, or commercially available product to be enclosed and may prevent the material from escaping. FIG. 22 shows a cross section of the area including the reservoir space in the palate-covering plate of the device of FIG. 21. It is noted that an appliance is shown in FIG. 19, but the device in FIG. 19 has the connecting mechanism that provide the attachment to the appliance, and thus the device may be used with or without an appliance. The device depicted in FIGS. 19-22 may have similar holes, channels, or passages, to those described above in the device depicted by FIGS. 15-18, on the reservoir surface to allow for the diffusion of product.

Figure 23:
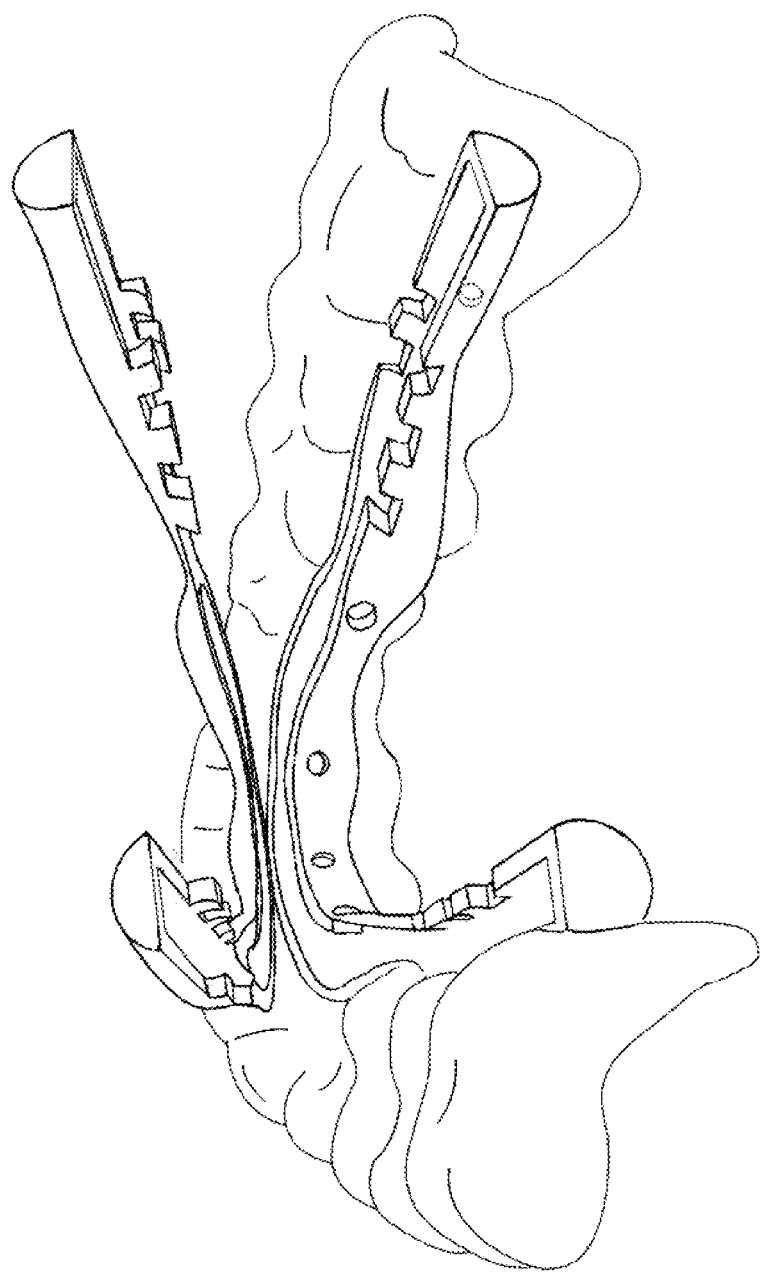
FIG. 23 shows a perspective view of the device with a clamshell canal, which is the reservoir that holds the product or other medication according to an embodiment of the present invention.
Figure 24:
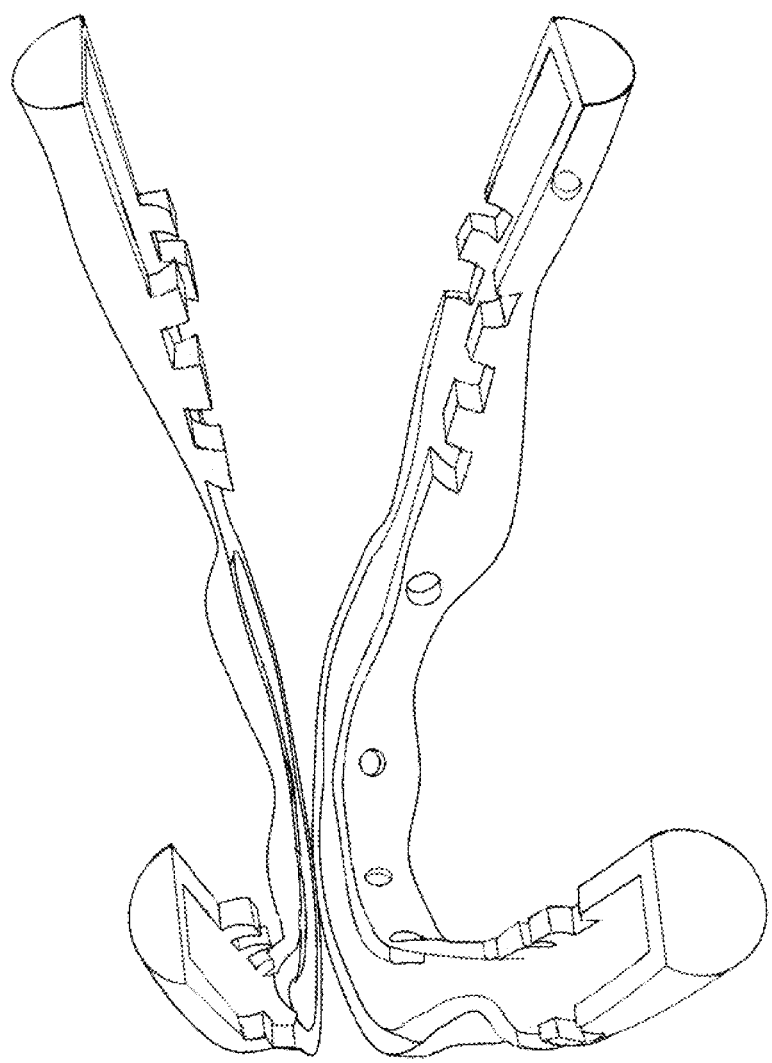
FIG. 24 shows a perspective view of a clamshell canal, which is the reservoir that holds the product or other medication according to an embodiment of the present invention.
Figure 25:
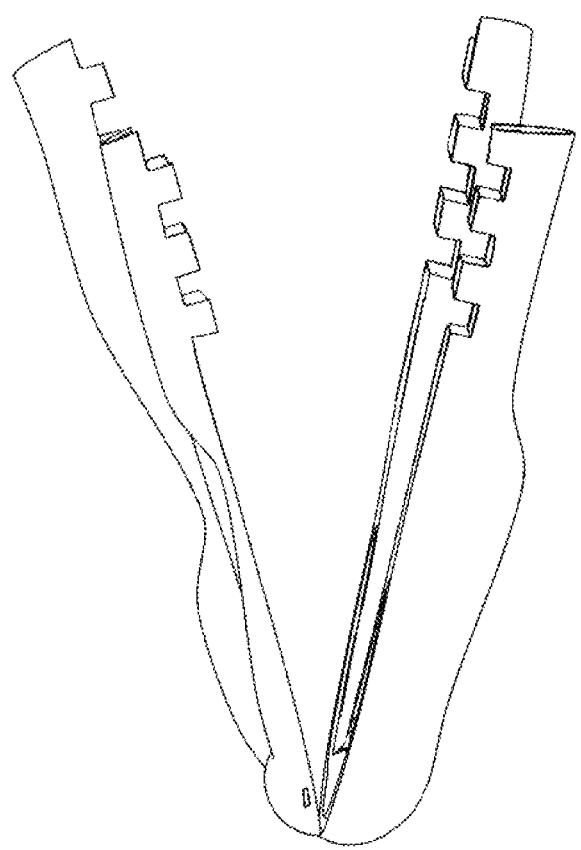
FIG. 25 shows a side view of FIG. 24.
Figure 26:
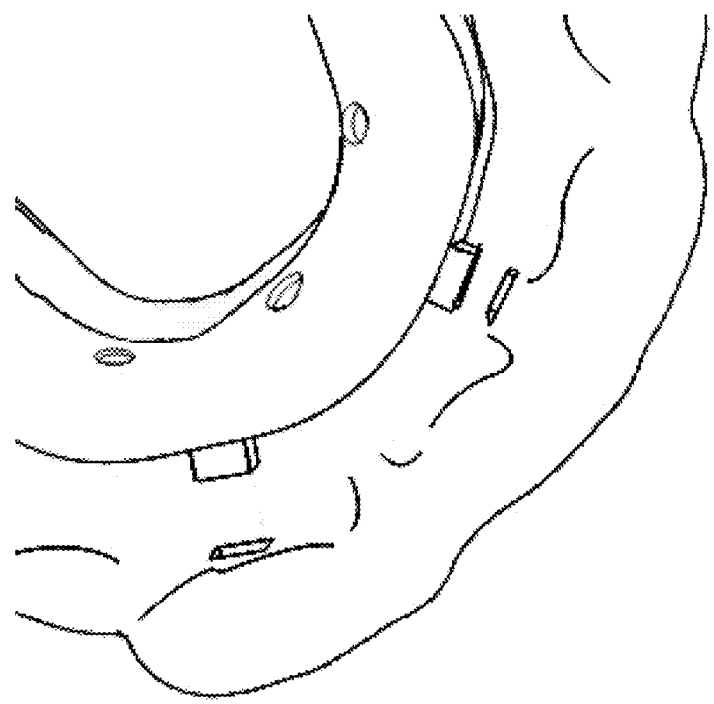
FIG. 26 shows a top perspective and close-up view of a clamshell canal, which is the reservoir that holds the product or other medication, connecting to a device according to an embodiment of the present invention.
Figure 26:
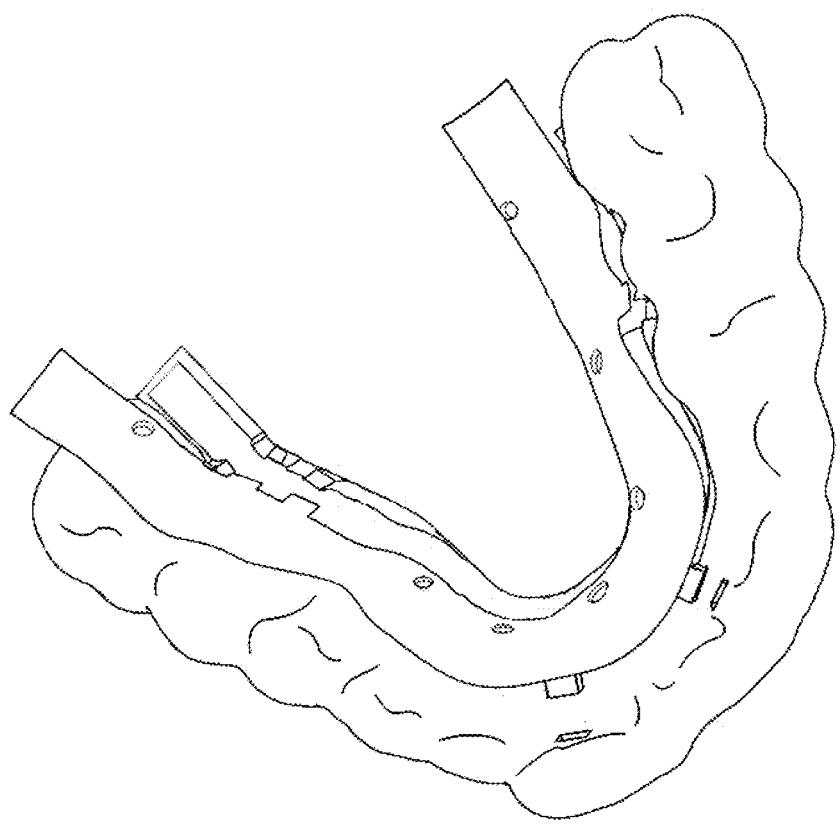

FIG. 23 illustrates a system or device according to an embodiment of the present teachings. FIG. 23 shows a device comprised of an external appliance and an internal two-part clamshell reservoir. The appliance may be a mold insert custom fitted to the user's mouth. The reservoir may have a canal shape. The reservoir may be split horizontally into an upper part and a lower part. The lower part may be permanently printed, molded, affixed, or otherwise secured to the appliance and may be larger than the upper part allowing for a larger surface area to bond to the appliance. The upper and lower parts may be separate pieces or may be connected by a hinge or other movable connection. The reservoir may be opened allowing the reservoir to be cleaned or loaded with product. The reservoir may have one or more openings to allow the loaded product to be diffused into the user's mouth. The reservoir may also be refilled via the one or more openings. The reservoir may have a locking mechanism to hold the upper and lower part of the reservoir together and may be releasable. The locking mechanism may be teeth like structures or crenellated steps along the edges that clamp or snap together. The reservoir may feature one or more sets of locking mechanisms in one or more locations along the edge of the reservoir. FIGS. 24-25 show alternate views of the reservoir detached from the appliance. FIG. 25 shows a male tab at the front of the reservoir. FIG. 26 illustrates the male-female closure tabs at the front of the reservoir and inside the appliance. In one embodiment the reservoir may be detachable from the appliance.

Figure 27:
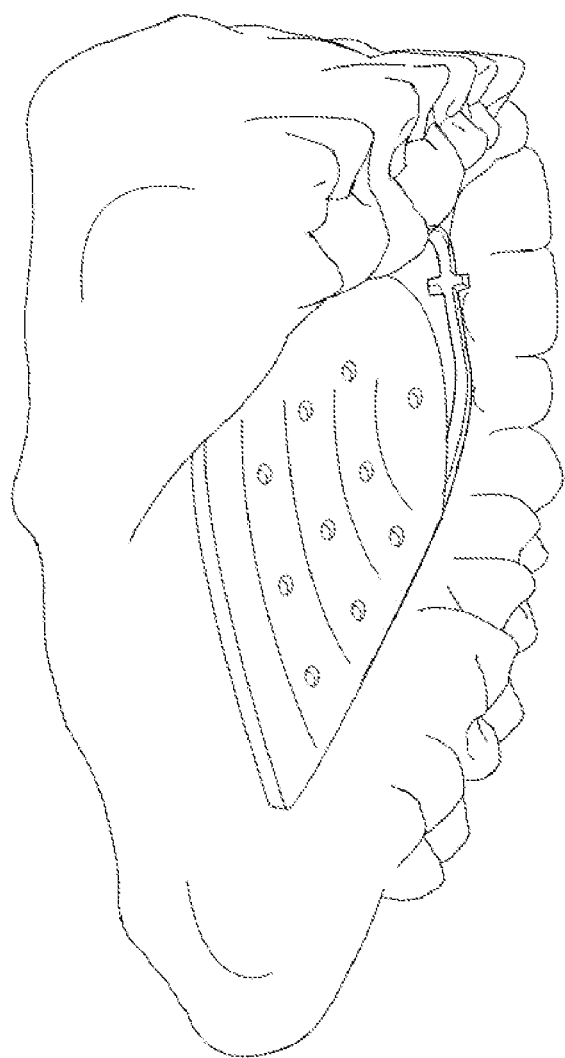
FIG. 27 shows a perspective view of a cartridge system inserted below the appliance palate according to one embodiment of the present teachings.

FIG. 27 illustrates a system or device according to an embodiment of the present teachings. FIG. 27 shows a device comprised of a prosthesis and an insert. The prosthesis may be full or partial dentures, false teeth, or other oral prosthesis. The prosthesis may be connected to the patient's gums, jaw, or teeth and may be held in place by friction, adhesive and/or vacuum pressure. The prosthesis may also be placed over or integrated between a patient's existing teeth. The insert may be a cartridge, foam, mesh, or other oral insert, containing product for oral diffusion. The insert may be positioned below the palate of the prothesis having holes or other openings for oral diffusion. The insert may attach to the prothesis via a groove, male/female connection, adhesive, or other removable attachment. FIG. 27 is similar to the embodiments depicted in FIGS. 1 and 2 adapted for use with dentures or other prothesis.

Figure 28:
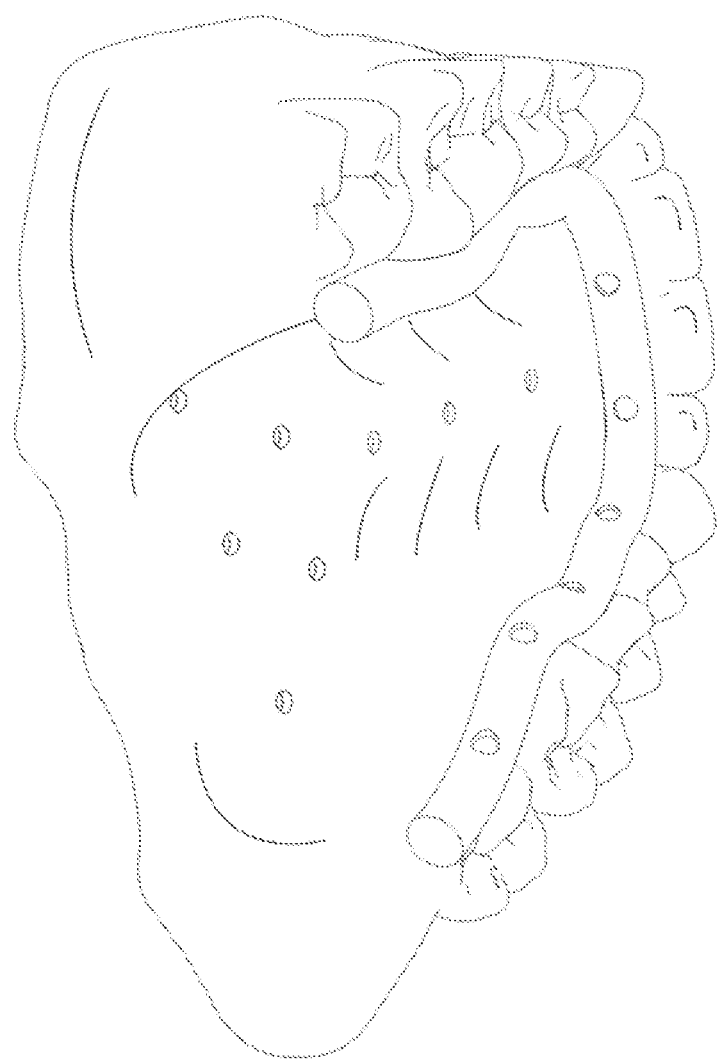
FIG. 28 shows a perspective view of a canal reservoir along the appliance and a reservoir tank inside of the appliance palate according to one embodiment of the present teachings.

FIG. 28 illustrates a system or device according to an embodiment of the present teachings. FIG. 28 shows a device comprised of a prosthesis, a canal and a reservoir. The prosthesis may be full or partial dentures, false teeth, or other oral prosthesis. The prosthesis may connect to the patient's gums, jaw, or teeth and may be held in place by friction, adhesive and/or vacuum pressure. The prosthesis may also be placed over or integrated between a patient's existing teeth. The reservoir and the canal may be filled with product for oral diffusion and may be filled with the same or different products. The palate of the prosthesis may contain the reservoir. The palate of the prothesis may have holes or other openings for the product in reservoir to diffuse into the patient's mouth. The top of the prosthesis may also have holes or other openings to allow product to be diffused above the prosthesis. The reservoir may be similar to the embodiments of the reservoir depicted in FIGS. 15-22. The canal may be positioned along the teeth of the prothesis and may have holes or other openings to diffuse product. The canal may be permanently or removable affied to the prosthesis. The canal may be similar to the embodiments of the canal depicted in FIGS. 6-14 or similar to the embodiments of the canal depicted in FIGS. 23-26. In another embodiment the device may have the prosthesis and reservoir as described above without the canal. In a further embodiment the device may have the prosthesis and canal described above without the reservoir.

The device may be manufactured utilizing 3D scanner additive manufacturing, vacuum forming, thermoforming, wax molding, CNC milling machines, other dental appliance forming methods, or a combination of the aforementioned.

The device may be refilled using in-house dispensing caps fitted on product containers, pre-loaded syringes, single use squeeze containers, single use or reusable impregnated foam or mesh inserts, single use or reusable cartridges, tablets, time-release products, aerosols, or sprays. The refilling method used may depend on the product being loaded and/or the specifics of the embodiment of the device.

Although the invention has been illustrated and described herein with reference to a preferred embodiment and a specific example thereof, it will be readily apparent to those of ordinary skill in the art that other embodiments and examples may perform similar functions and/or achieve user experiences. All such equivalent embodiments and examples are within the spirit and scope of the present invention, are contemplated thereby, and are intended to be covered by the disclosure.

In compliance with the statute, the present teachings have been described in language more or less specific as to structural and methodical features. It is to be understood, however, that the present teachings are not limited to the specific features shown and described, since the systems and methods herein disclosed comprise preferred forms of putting the present teachings into effect. The present disclosure is to be considered as an example of the invention and is not intended to limit the invention to a specific embodiment illustrated by the figures above or description below.

For purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail.

Generally, all terms used are to be interpreted according to their ordinary meaning in the technical field, unless explicitly defined otherwise herein. All references to a/an/ the element, apparatus, component, means, step, etc. are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second," etc. for different features/components of the present disclosure are only intended to distinguish the features/ components from other similar features/components and not to impart any order or hierarchy to the features/components. As used herein, the term "and/or" includes any and all combinations of one or more of the associated listed items. As used herein, the term "application" is intended to be interchangeable with the term "invention", unless context clearly indicates otherwise.

While the present teachings have been described above in terms of specific embodiments, it is to be understood that they are not limited to these disclosed embodiments. Many modifications and other embodiments will come to mind to those skilled in the art to which this pertains, and which are intended to be and are covered by this disclosure. It is intended that the scope of the present teachings should be determined by proper interpretation and construction of the disclosure and its legal equivalents, as understood by those of skill in the art relying upon the disclosure in this specification and the attached drawings. In describing the invention, it will be understood that a number of techniques and steps are disclosed. Each of these has individual benefits and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification should be read with the understanding that such combinations are entirely within the scope of the invention.

What is claimed is:

1. A system for delivering an oral moisturizer, comprising:
    an appliance configured to be disposed inside a user's mouth;
    the appliance having a U-shaped curved body with an exterior surface and an interior surface opposite the exterior surface, the interior surface defining a recess that is configured to receive an entire dental arch of the user,
    the appliance having a U-shaped reservoir that extends alongside a lingual side of the entire U-shaped curved body and is configured for receiving a predetermined amount of a product, the U-shaped reservoir being positioned outside of the recess;
    the U-shaped reservoir having ports for delivering the product into the user's mouth at a predetermined rate;
    the U-shaped reservoir being formed by a first part and a second part, the second part being affixed to the exterior surface along the lingual side of the U-shaped curved body,
    the U-shaped reservoir consisting of two locking mechanisms, the first part being releasably attached to the second part using the two locking mechanisms;
    wherein the U-shaped reservoir is refillable with the product;
    wherein each locking mechanism is located at a distal end of the U-shaped reservoir configured to be located next to the molar teeth.

2. The system of claim 1, wherein each locking mechanism comprises a series of crenellated steps.

3. The system of claim 1, further comprising an injector for filling the reservoir with the product.

4. The system of claim 1, wherein the reservoir comprises a microporous membrane.

5. The system of claim 1, wherein the ports are in the second part.

6. The system of claim 1, wherein the reservoir is refillable with the product when the first part is detached from the second part.

7. The system of claim 1, wherein the curved body comprises one of an Essix Appliance, a Hawley Appliance, a vacuum pressure appliance, or a molded mouthguard.

8. The system of claim 1, wherein the curved body comprises a denture.

9. The system of claim 1, wherein the reservoir is disposable.

10. The system of claim 1, wherein the reservoir comprises a cartridge.

11. The system of claim 1, wherein the curved body is a molded insert customized with teeth and gums based on a 3D dental model of the user.

12. The system of claim 1, further comprising the product, wherein the product is an oral moisturizer or medicine.

13. The system of claim 1, wherein the reservoir is configured to deliver the predetermined amount of the product to a user's mouth during the user's sleep.

14. A system for delivering an oral treatment, comprising:
    A U-shaped support having a palate-contacting or teeth-contacting portion, the support having an interior surface and an exterior surface;
    a U-shaped reservoir disposed on a lingual side of the support;
    the U-shaped reservoir configured to deliver a predetermined amount of a product to a user's mouth during the user's sleep;
    the U-shaped reservoir being formed by a first part and a second part, the second part being affixed along the exterior surface of the lingual side of the support, the first part being releasably attached to the second part;

wherein the first part is releasably locked to the second part by only two locking mechanisms, wherein each locking mechanism comprises crenellated steps, a clamp, or a male-female tab;

wherein the U-shaped reservoir is refillable with the product;

wherein each locking mechanism is located at a distal end of the U-shaped reservoir configured to be located next to the molar teeth.

15. A system for delivering an oral treatment, comprising:

a device configured to be inserted in a user's mouth, the device having a U-shaped curved body configured to receive an entire dental arch of the user;

the U-shaped curved body having an interior surface and an exterior surface;

a U-shaped reservoir disposed along a lingual side of the curved body and configured to receive a product for oral treatment, the U-shaped reservoir being positioned on the exterior surface of the curved body;

the U-shaped reservoir configured to deliver a predetermined amount of the product to the user's mouth at a predetermined rate;

the U-shaped reservoir comprising a first part and a second part, the second part being affixed to the curved body via male-female tabs, the first part being releasably attached to the second part using only two locking mechanisms;

wherein each locking mechanism is located at a distal end of the U-shaped reservoir configured to be located next to the molar teeth.

16. The system of claim 15, wherein the male-female tabs are located at a front portion of the reservoir.

17. The system of claim 16, wherein each locking mechanism comprises male-female tabs, the second part having the female tab of the locking mechanism and the first part having the male tab of the locking mechanism, said female tab configured to receive the male tab.

18. The system of claim 15, wherein the reservoir is substantially in the form of an U-shaped channel.

* * * * *